(12) United States Patent
Ting et al.

(10) Patent No.: US 10,788,866 B2
(45) Date of Patent: Sep. 29, 2020

(54) PORTABLE ELECTRONIC DEVICE (71) Applicants: INVENTEC (PUDONG) TECHNOLOGY CORPORATION, Shanghai (CN); INVENTEC CORPORATION, Taipei (TW)

(72) Inventors: Ssu Han Ting, Taipei (TW); Chih-Cheng Li, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 91 days.

(21) Appl. No.: 16/189,121

(22) Filed: Nov. 13, 2018

(65) Prior Publication Data

US 2019/0212789 A1 Jul. 11, 2019

(30) Foreign Application Priority Data

Jan. 9, 2018 (CN) .......................... 2018 1 0020029

(51) Int. Cl.
*H01Q 1/22* (2006.01)
*G06F 1/16* (2006.01)
*H01F 27/29* (2006.01)
*H01F 27/28* (2006.01)

(52) U.S. Cl.
CPC .......... *G06F 1/1698* (2013.01); *G06F 1/1681* (2013.01); *G06F 1/1683* (2013.01); *H01F 27/29* (2013.01); *H01Q 1/22* (2013.01); *H01F 27/2804* (2013.01)

(58) Field of Classification Search
CPC ............ H01Q 1/38; H01Q 1/50; H01Q 23/00; H01Q 13/085; H01Q 1/2258; H01Q 1/22; H01P 5/10; H01F 27/2804; H01F 27/29; G06F 1/1681; G06F 1/1683; G06F 1/1698
See application file for complete search history.

(56) References Cited

U.S. PATENT DOCUMENTS

| 7,009,572 B1 * | 3/2006 | Homer | H01Q 13/085 343/767 |
| 7,148,855 B1 * | 12/2006 | Homer | H01Q 13/085 343/767 |
| 2013/0038495 A1 * | 2/2013 | Benzel | H01Q 13/085 343/770 |
| 2019/0273319 A1 * | 9/2019 | Ting | H01Q 13/085 |

* cited by examiner

*Primary Examiner* — Dameon E Levi
*Assistant Examiner* — David E Lotter
(74) *Attorney, Agent, or Firm* — Maschoff Brennan (57) ABSTRACT

A portable electronic device comprises a main body and an antenna. The main body comprises a first casing, a second casing and a hinge. The antenna comprises a first metal layer, a second metal layer and a balun transformer. The first metal layer formed at the first casing has a first bending side edge. The second metal layer formed at the second casing has a second bending side edge. A tapered slot is formed between the second bending side edge and the first bending side edge, and comprises a necking end and a flaring end. The balun transformer disposed in the first casing, the second casing or the hinge has one signal input terminal and two signal output terminals, receives a feed signal and a ground signal via the signal input terminal to generate two balanced signals, and respectively outputs the balanced signals via the signal output terminals.

6 Claims, 7 Drawing Sheets

PORTABLE ELECTRONIC DEVICE

CROSS-REFERENCE TO RELATED APPLICATIONS

This non-provisional application claims priority under 35 U.S.C. § 119(a) on Patent Application No(s). 201810020029.4 filed in China on Jan. 9, 2018, the entire contents of which are hereby incorporated by reference.

BACKGROUND

Technical Field

This disclosure relates to a portable electronic device, and particularly to a portable electronic device with an antenna.

Related Art

Nowadays, Internet technologies are booming and the Internet applications have become inseparable from modern life. For example, people can learn about news and information, contact with friends and family, record their life, etc. In response to the demand of personal portable electronic devices, the way to access the Internet has developed from Internet access to wireless Internet access. Almost all portable electronic devices, such as laptops, personal digital assistants, smart phones and even digital cameras, are equipped with wireless Internet access.

The antenna is a key component for wireless communication. Currently, the antenna design embedded in a portable electronic device, such as a metal stamping antenna or a printed circuit board antenna, requires a metal processing mold for manufacture. Since making the mold is not only expensive but time consuming, it is difficult to control the cost and the schedule of the development of new products. Moreover, when the embedded antenna outputs an electromagnetic wave from the inside of a portable electronic device, the radiation field of the antenna must be damaged by the metal components surrounding it. As a result, in the design of the casing of the portable electronic device, it is generally necessary to reserve the area of non-metal material for the embedded antenna to output the electromagnetic wave.

SUMMARY

This disclosure provides a portable electronic device and an antenna thereof.

According to an embodiment of this disclosure, a portable electronic device comprises a main body and an antenna. The main body comprises a first casing, a second casing and a hinge, with the hinge connecting the first casing and the second casing so as to allow the first casing to be flipped relatively to the second casing. The antenna is configured to output an electromagnetic wave, and comprises a first metal layer, a second metal layer and a balun transformer. The first metal layer is formed at the first casing, and has a first bending side edge and a first feed position. The second metal layer is formed at the second casing, and has a second bending side edge and a second feed position. A tapered slot is formed between the second bending side edge and the first bending side edge, and comprises a necking end and a flaring end. The balun transformer is disposed in the first casing, the second casing or the hinge, and has one signal input terminal and two signal output terminals. The balun transformer receives a feed signal and a ground signal via the signal input terminal so as to generate two balanced signals, and respectively outputs the two balanced signals via the two signal output terminals.

According to an embodiment of this disclosure, an antenna is applied to a portable electronic device. The antenna comprises a first metal layer, a second metal layer and a balun transformer. The first metal layer has a first bending side edge and a first feed position, and the second metal layer has a second bending side edge and a second feed position. A tapered slot is formed between the second bending side edge and the first bending side edge, and comprises a necking end and a flaring end. The balun transformer has one signal input terminal and two signal output terminals, receives a feed signal and a ground signal via the signal input terminal so as to generate two balanced signals, and respectively outputs the two balanced signals via the two signal output terminals.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
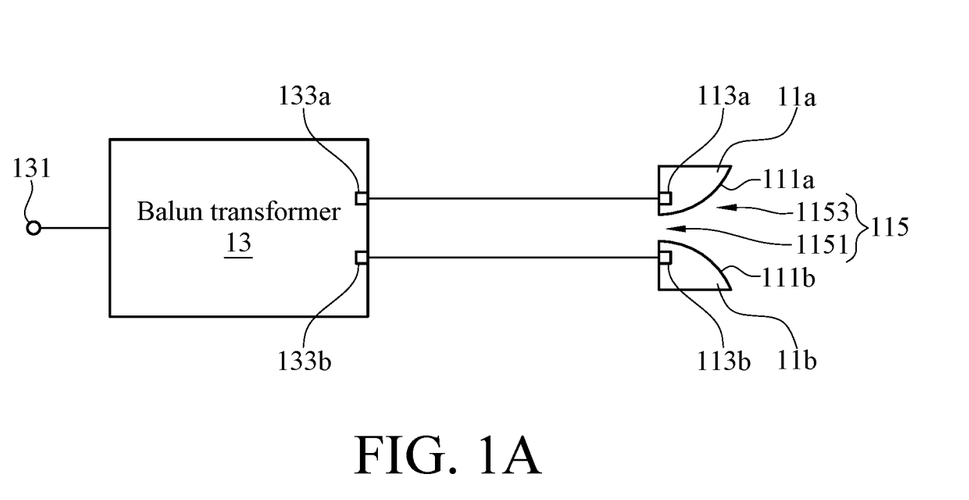
FIG. 1A is a schematic diagram of an antenna applied to a portable electronic device according to an embodiment of this disclosure.
Figure 1B:
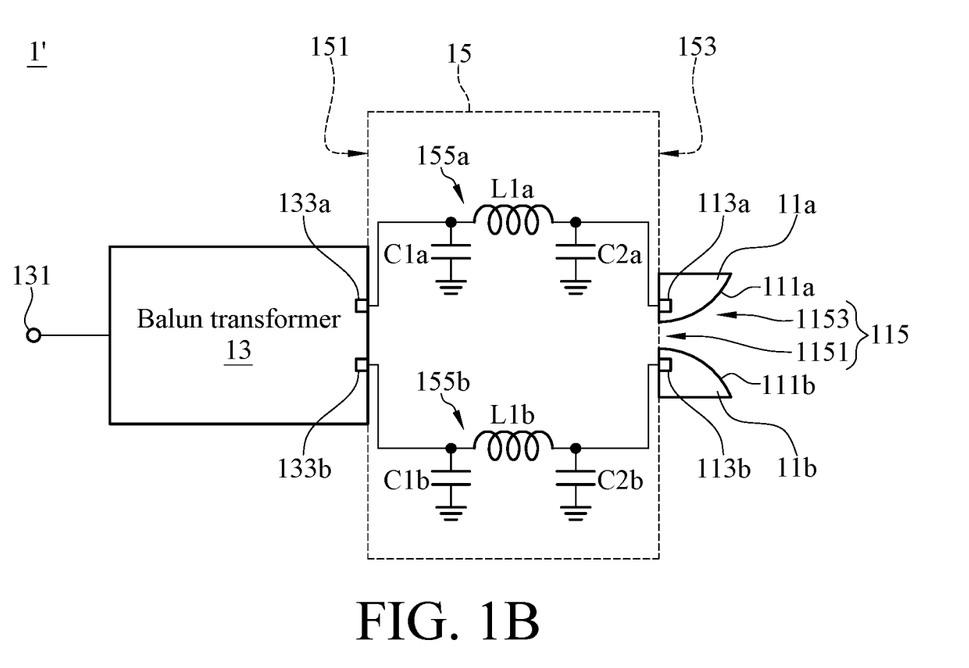
FIG. 1B is a schematic diagram of an antenna applied to a portable electronic device according to another embodiment of this disclosure.

Please refer to FIGS. 1A and 1B, wherein FIG. 1A is a schematic diagram of an antenna applied to a portable electronic device according to an embodiment of this disclosure, and FIG. 1B is a schematic diagram of an antenna applied to a portable electronic device according to another embodiment of this disclosure. In the embodiments as shown in FIGS. 1A and 1B, the antennas 1 and 1' are applied to portable electronic devices, such as laptops. The detailed disposition of the antenna 1 or 1' in a portable electronic device is described later.

As shown in FIG. 1A, the antenna 1 comprises a first metal layer 11a, a second metal layer 11b and a balun transformer 13. The first metal layer 11a has a first bending side edge 111a and a first feed position 113a, and the second metal layer 11b has a second bending side edge 111b and a second feed position 113b, wherein a tapered slot 115 comprising a necking end 1151 and a flaring end 1153 is formed between the first bending side edge 111a of the first metal layer 11a and the second bending side edge 111b of the second metal layer 11b. More specifically, the first bending side edge 111a and the second bending side edge 111b can respectively be two convex arcs, and these two convex arcs are oppositely disposed to form the tapered slot 115. Moreover, the first bending side edge 111a the second bending side edge 111b can also be side edges having a number of bending portions, and the details are described later.

The balun transformer 13, such as a balanced-to-unbalanced transformer, has one signal input terminal 131 and two signal output terminals 133a and 133b. The signal input terminal 131 is configured to receive a feed signal and a ground signal. More specifically, the signal input terminal 131 can be electrically connected with a coaxial cable. The coaxial cable comprises at least a conducting wire, an insulation layer coating the conducting wire, and a conductive layer outside the insulation layer, wherein the conducting wire transmits the feed signal to the balun transformer 13, and the conductive layer transmits the ground signal to the balun transformer 13. The balun transformer 13 generates two balanced signals based on the feed signal and the ground signal from the coaxial cable, and outputs these two balanced signals respectively via the signal output terminals 133a and 133b. More specifically, these two balanced signals have the same amplitude but their phases differ by 180 degrees.

In another embodiment, as shown in FIG. 1B, the antenna 1' similar to the antenna 1 shown in FIG. 1A comprises the first metal layer 11a, the second metal layer 11b and the balun transformer 13, wherein the detailed structures thereof and connections therebetween are similar to those in the embodiment of FIG. 1A so they are not repeated herein. In this embodiment, in addition to the above components, the antenna 1' further comprises a regulation circuit 15. The regulation circuit 15 has a first side 151 and a second side 153, wherein the first side 151 is electrically connected with the two signal output terminals 133a and 133b of the balun transformer 13, and the second side 153 is electrically connected with the first feed position 113a of the first metal layer 11a and the second feed position 113b of the second metal layer 11b. The two signal output terminals 133a and 133b of the balun transformer 13 are respectively electrically connected with the first feed position 113a of the first metal layer 11a and the second feed position 113b of the second metal layer 11b via the regulation circuit 15.

More specifically, the regulation circuit 15 comprises two impedance matching circuits 155a and 155b. Each of the impedance matching circuits 155a and 155b has a first terminal and a second terminal, wherein the first terminals of the impedance matching circuits 155a and 155b forms the first side 151 of the regulation circuit 15, and the second terminals of the impedance matching circuits 155a and 155b forms the second side 153 of the regulation circuit 15. The first terminals of the impedance matching circuits 155a and 155b are respectively connected with the two signal output terminals 133a and 133b of the balun transformer 13, and the second terminals of the impedance matching circuits 155a and 155b are respectively connected with the first feed position 113a of the first metal layer 11a and the second feed position 113b of the second metal layer 11b. In other words, the signal output terminal 133a of the balun transformer 13 is connected with the first feed position 113a of the first metal layer 11a via the impedance matching circuit 155a, and the signal output terminal 133b is connected with the second feed position 113b of the second metal layer 11b via the impedance matching circuit 155b.

The impedance matching circuits 155a and 155b are configured to match the characteristic impedance of the signal end with the impedance of the load end of the antenna 1'. In other words, the impedance matching circuits 155a and 155b can match the characteristic impedance of the side connected with the balun transformer 13 with the impedance of the side connected with the first and second metal layers 11a and 11b so as to adjust the electrical signal of the entire antenna 1'. For example, each of the impedance matching circuits 155a and 155b is a π type circuit. The impedance matching circuit 155a comprises an inductor L1a and two capacitors C1a and C2a, and the impedance matching circuit 155b comprises an inductor L1b and two capacitors C1b and C2b, wherein the detailed connections among the above components are the common knowledge in the art of this disclosure, so they are not described herein. In yet another embodiment, the regulation circuit 15 can further comprise a phase adjustment circuit for adjusting the phase difference between the feed signal and the ground signal so as to generate various electromagnetic waves with different wave velocities or directivities.

The following is a detailed description of the process of generating and outputting an electromagnetic wave by the antennas 1 and 1' in the above embodiments. The balun transformer 13 simultaneously receives the feed signal and the ground signal from the coaxial cable so as to generate two balanced signals; then, the balun transformer 13 outputs said two balanced signals to the first metal layer 11a and the second metal layer 11b via the two signal output terminals 133a and 133b respectively, or said two balanced signals are adjusted by the regulation circuit 15 ahead, and then respectively transmitted to the first metal layer 11a and the second metal layer 11b; after, the first metal layer 11a and the second metal layer 11b generate the electromagnetic wave based on the received signals, and the electromagnetic wave is outputted through the tapered slot 115. In particular, the tapered structure between the necking end 1151 and the flaring end 1153 of the tapered slot 115 is similar to the structure of a Vivaldi antenna.

Figure 2:
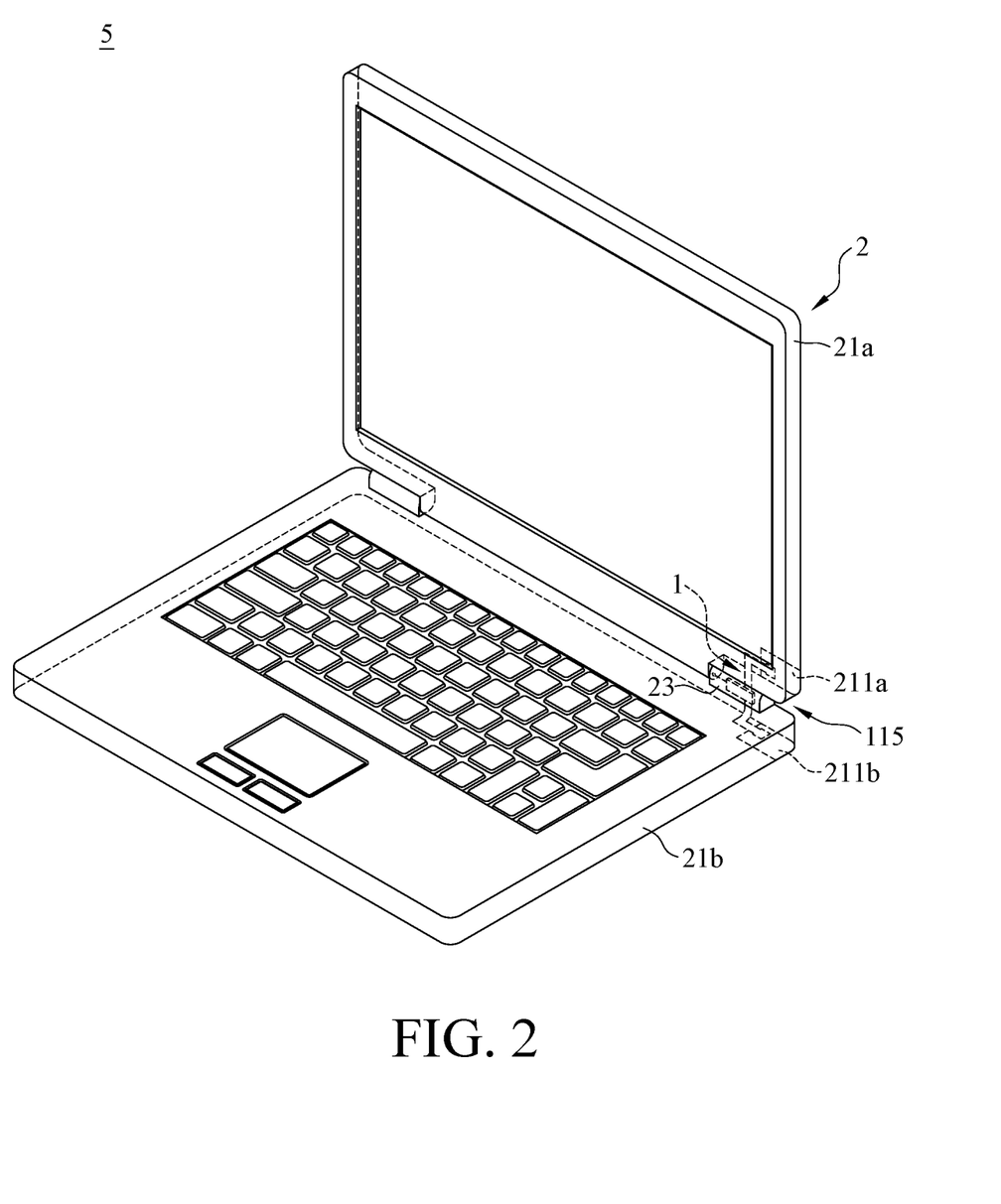
FIG. 2 is a schematic diagram of a portable electronic device according to an embodiment of this disclosure.

Please refer to FIGS. 1A, 1B and 2, wherein FIG. 2 is a schematic diagram of a portable electronic device according to an embodiment of this disclosure.

In the embodiment shown in FIG. 2, the portable electronic device 5 comprises a main body 2 and the antenna 1 as described in the aforementioned embodiment of FIG. 1A. In particular, FIG. 2 merely exemplarily illustrates the portable electronic device 5, and the portable electronic device 5 can also comprise the main body 2 and the antenna 1' as described in the aforementioned embodiment of FIG. 1B. For example, the portable electronic device 5 is a laptop or other electronic device with a clamshell structure. In this embodiment, a laptop exemplifies the portable electronic device 5, and the main body 2 of the portable electronic device 5 comprises a first casing 21a, a second casing 21b and a hinge 23. Moreover, the main body 2 also comprises the components that a typical laptop has, such as a central processing unit, memory, etc. The details of these components belong to common knowledge in the art so they are not described herein. The hinge 23 of the main body 2 connects the first casing 21a and the second casing 21b so as to allow the first casing 21a to be flipped relatively to the second casing 21b.

The antenna 1, as described in the aforementioned embodiment of FIG. 1A, comprises the first metal layer 11a, the second metal layer 11b and the balun transformer 13, wherein the detailed structures thereof and connections therebetween are similar to those in the embodiment of FIG. 1A, so they are note repeated. As shown in FIG. 2, the antenna 1 can be disposed in the peripheral region of the hinge 23 of the portable electronic device 5. The balun transformer 13 of the antenna 1 can be disposed in the first casing 21a, the second casing 21b or the hinge 23. In this embodiment, the first metal layer 11a is formed at the first casing 21a, and particularly in the corner region 211a of the first casing 21a near the hinge 23, and the second metal layer 11b is formed at the second casing 21b, and particularly in the corner region 211b of the second casing 21b near the hinge 23, wherein the corner regions 211a and 211b are located on the same side of the portable electronic device 5. In another embodiment, the first metal layer 11a is the first casing 21a made of metal, such as the outer layer of the metal upper lid of a laptop; the second metal layer 11b is the second casing 21b made of metal, such as the outer layer of the metal bottom base of the laptop.

Figure 3A:
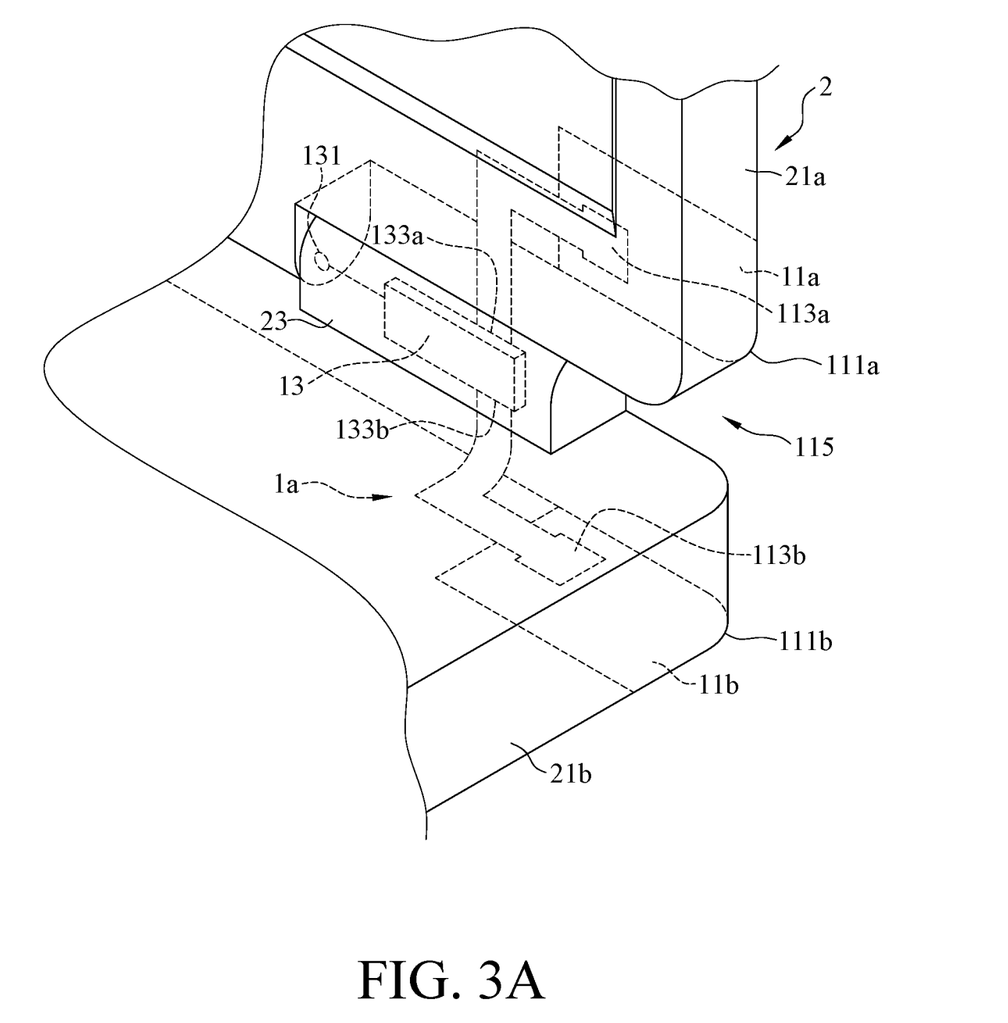
FIG. 3A is a partial schematic diagram of a portable electronic device according to an embodiment of this disclosure.
Figure 3B:
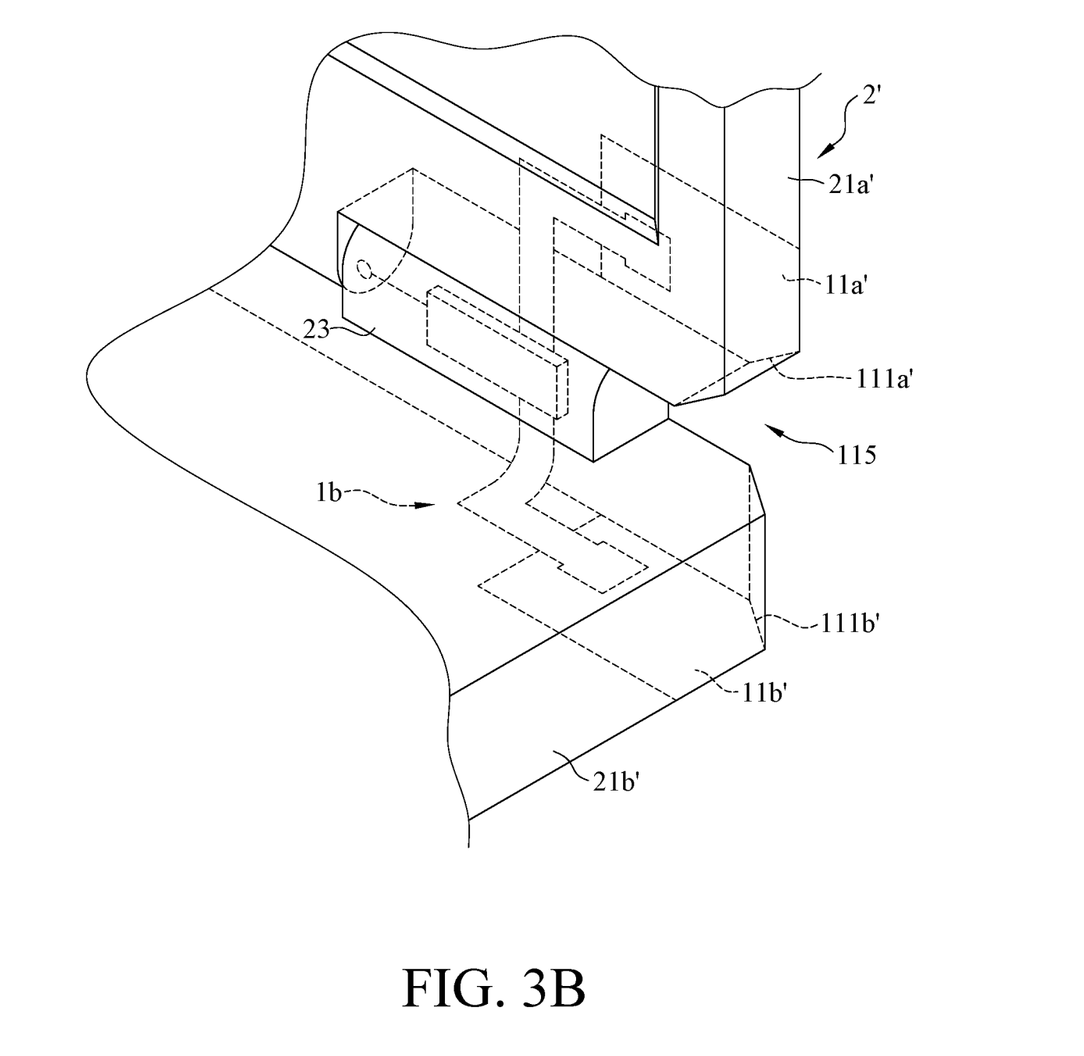
FIG. 3B is a partial schematic diagram of a portable electronic device according to another embodiment of this disclosure.
Figure 3C:
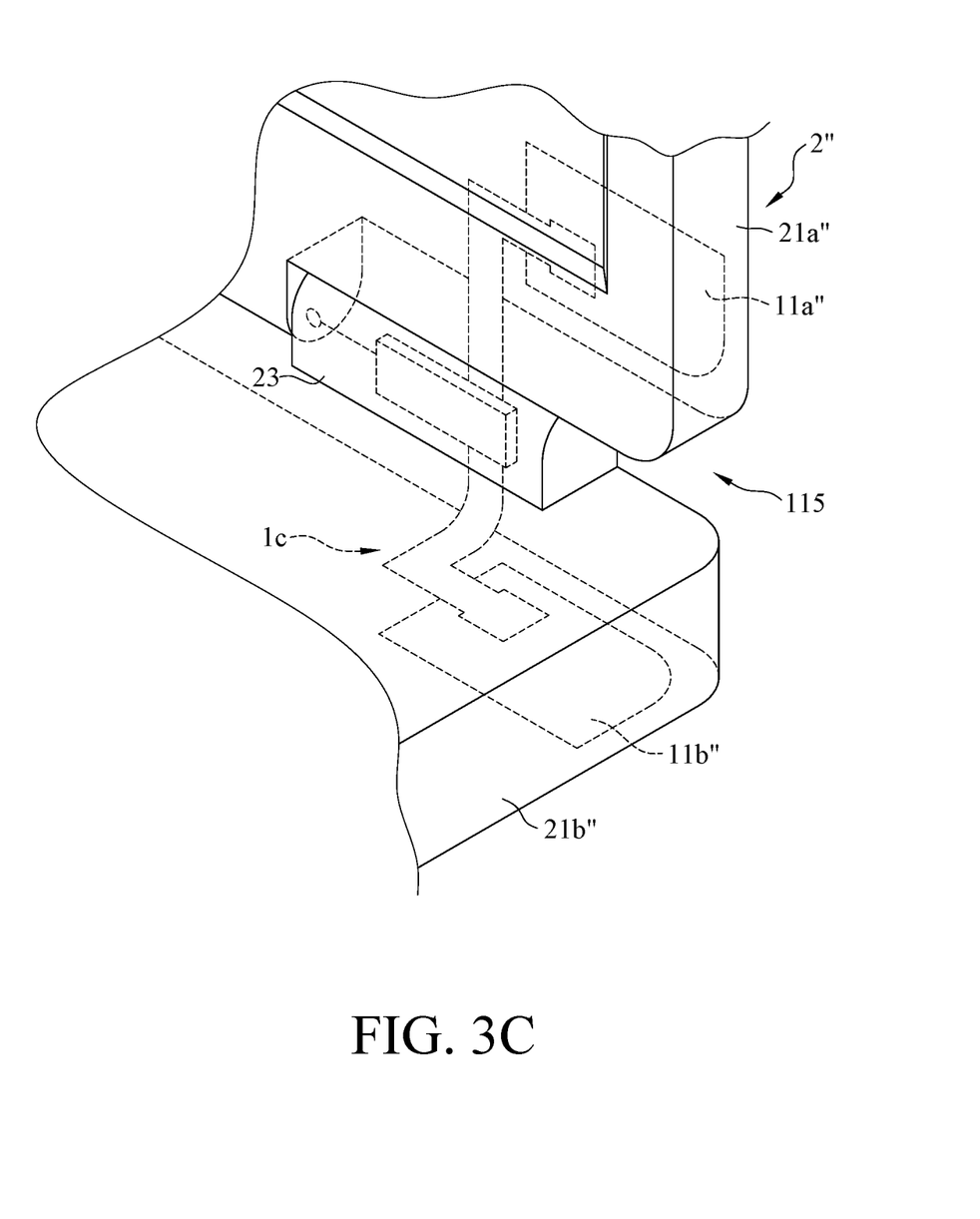
FIG. 3C is a partial schematic diagram of a portable electronic device according to yet another embodiment of this disclosure.

Please refer to FIGS. 1A, 2 and 3A-3C for describing the detailed disposition of the antenna 1, wherein FIG. 3A is a partial schematic diagram of a portable electronic device according to an embodiment of this disclosure; FIG. 3B is a partial schematic diagram of a portable electronic device according to another embodiment of this disclosure; and FIG. 3C is a partial schematic diagram of a portable electronic device according to yet another embodiment of this disclosure.

As shown in FIG. 3A, the balun transformer 13 of the antenna 1a is disposed in the hinge 23, and transmits signals to the first metal layer 11a and the second metal layer 11b via conducting wires respectively. The first bending side edge 111a of the first metal layer 11a is aligned with a corner of the first casing 21a of the portable electronic device main body 2, and the second bending side edge 111b of the second metal layer 11b is aligned with a corner of the second casing 21b of the portable electronic device main body 2. In this embodiment, the corners of the portable electronic device main body 2 are round corners common in a laptop. Therefore, both the first bending side edge 111a which is aligned with the corner of the first casing 21a and the second bending side edge 111b which is aligned with the corner of the second casing 21b are the convex arcs, and the tapered slot 115 is formed between these two convex arcs. In other words, the tapered slot 115 indicates the gap defined by the corner of the first casing 21a, the hinge 23 and the corner of the second casing 21b. This gap is similar to the slot structure of a Vivaldi antenna. In this embodiment, by using the gap as the slot for outputting an electromagnetic wave, the fabrication process of the slot may be removed, so that the entire fabrication process of the portable electronic device 5 may be simplified. Moreover, because there is possibly no need to dispose a slot on the casing, the portable electronic device 5 may be designed to have all-metal casing and its external appearance may be improved.

In another embodiment as shown in FIG. 3B, the balun transformer 13 of an antenna 1b, similar to that of the antenna 1a as shown in FIG. 3A, is disposed in the hinge 23 and transmits signals to the first metal layer 11a' and the second metal layer 11b' via conducting wires respectively. The first bending side edge 111a' of the first metal layer 11a is aligned with a corner of the first casing 21a' of the portable electronic device main body 2', and the second bending side edge 111b' of the second metal layer 11b' is aligned with a corner of the second casing 21b' of the portable electronic device. The difference between this embodiment and the embodiment of FIG. 3A is that the corners of the portable electronic device main body 2' have a number of arises, so that each of the first bending side edge 111a' and the second bending side edge 111b' is a side edge with a number of bending portions. In this embodiment, the tapered slot 115', similar to that of the previous embodiment, is a gap defined by the corner of the first casing 21a', the hinge 23 and the corner of the second casing 21b'. In particular, for the first bending side edge 111a' and second bending side edge 111b' with the bending portions in this disclosure, their bending angles and the number of bending away from the hinge 23 can be designed based on the actual required antenna characteristics, and are not limited to the implementation shown in FIG. 3B.

In yet another embodiment, as shown in FIG. 3C, there is a gap between the first bending side edge 111a" of the first metal layer 11a" of the antenna 1c and the corner of the first casing 21a", and there is also a gap between the second bending side edge 111b" of the second metal layer 11b" and the corner of the second casing 21b". This implementation is also applied to the first bending side edge 111a" and the second bending side edge 111b" with the bending portions. In this embodiment, as mentioned in the previous embodiment, there is possibly no need to perform etching process of a slot on the metal layer, and also possibly no need to design an antenna pattern with a slot and to perform printing process, so that the entire fabrication process may be simplified.

In particular, in the aforementioned embodiments of FIGS. 3A-3C, the first metal layers 11a, 11a' and 11a" are respectively exemplarily illustrated to be in the corner regions of the first casings 21a, 21a' and 21a", and the second metal layers 11b, 11b' and 11b" are respectively exemplarily illustrated to be in the corner regions of the second casings 21b, 21b' and 21b". However, the areas and locations of the first and second metal layers can be designed based on actual fabrication. The first metal layer and the second metal layer can also respectively cover the entire first casing and second casing, such as the outer layer of the metal upper lid and the outer layer of the metal bottom base of a laptop. Moreover, the first metal layer can be disposed on the outside of the upper lid of the laptop or between the outside and the inside (i.e. the side where the screen is disposed) of the upper lid, and the second metal layer can be disposed on the outside of the bottom base of the laptop, between the outside and the inside (i.e. the side where the keyboard is disposed) of the bottom base of the laptop, or on the inside of the bottom base, which are not limited in this disclosure.

Figure 4A:
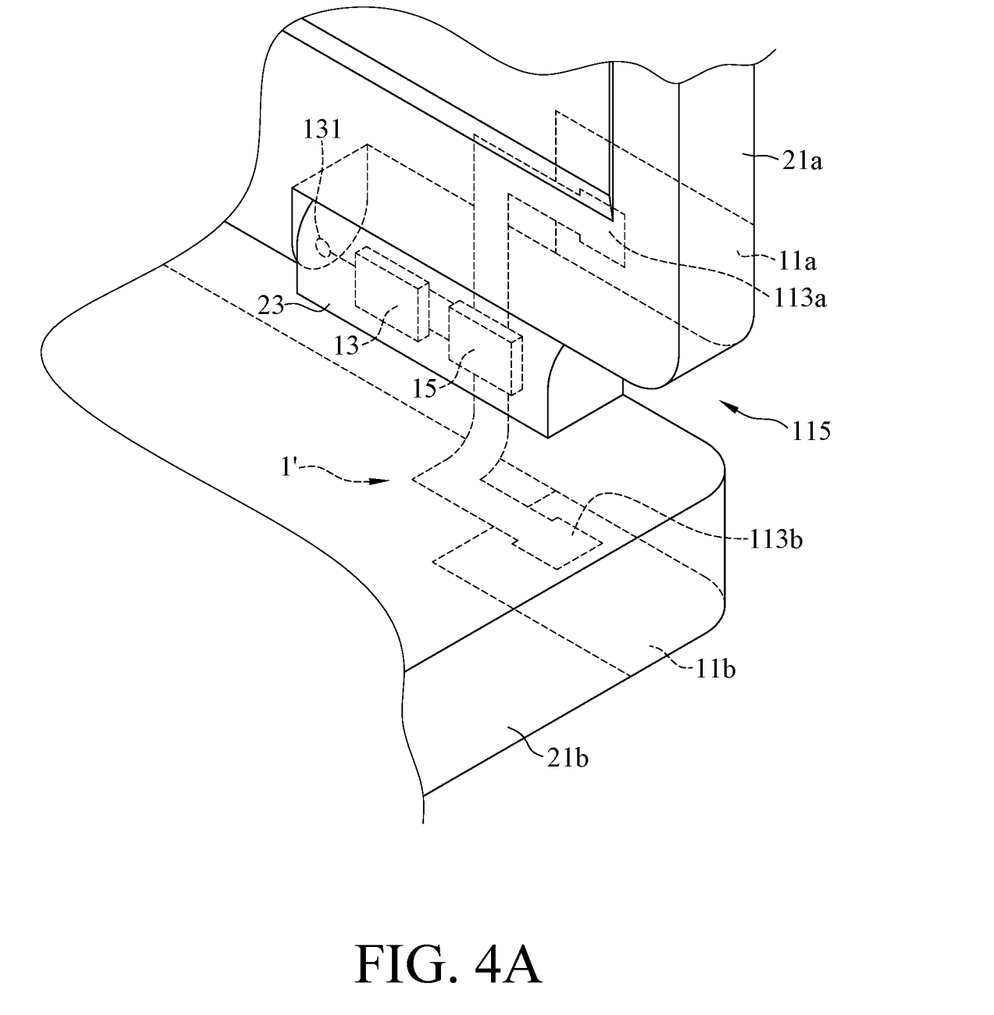
FIG. 4A is a partial schematic diagram of a portable electronic device according to yet another embodiment of this disclosure.
Figure 4B:
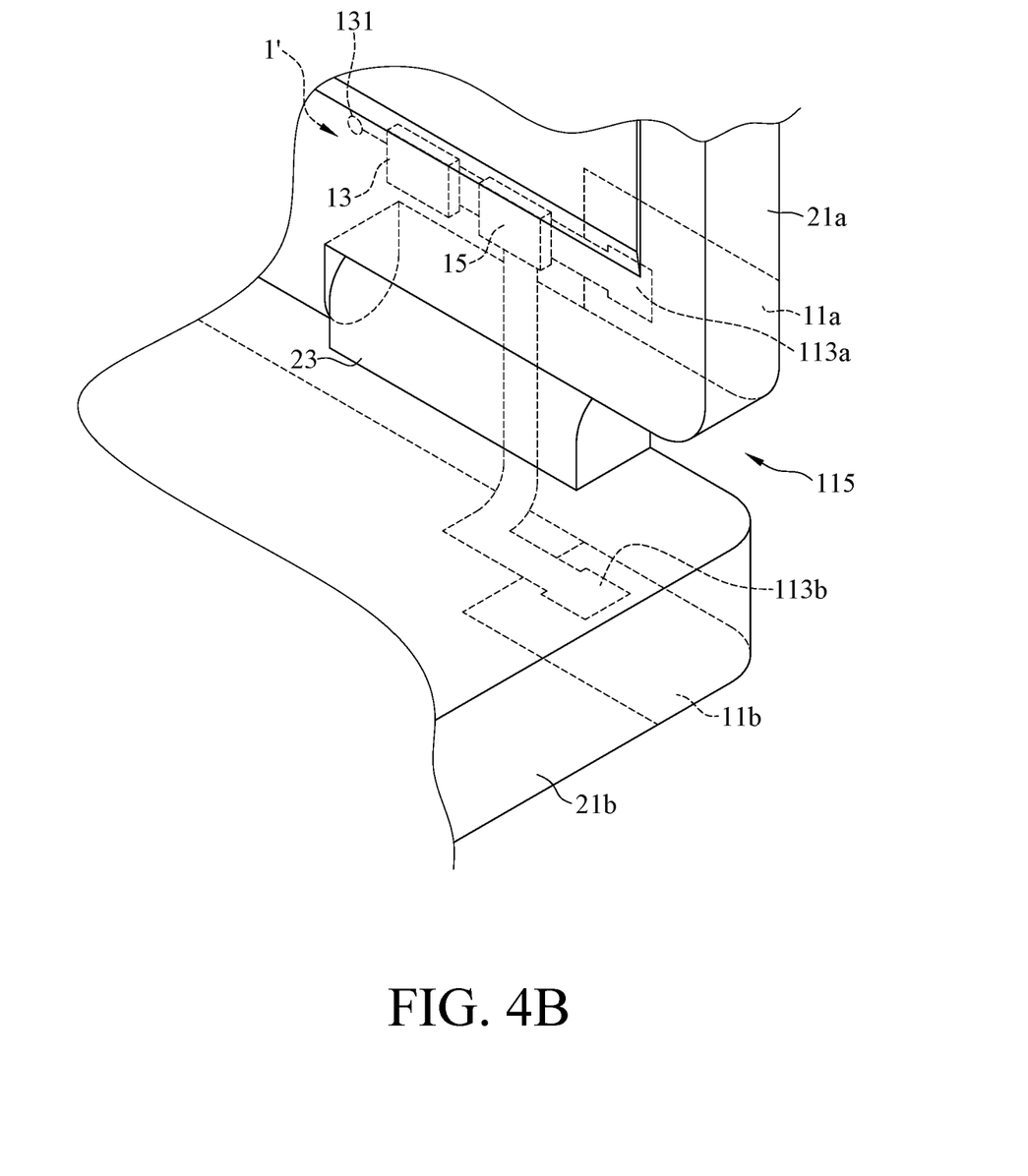
FIG. 4B is a partial schematic diagram of a portable electronic device according to yet another embodiment of this disclosure.

Please refer to FIGS. 1B, 4A and 4B, wherein FIG. 4A and FIG. 4B are partial schematic diagrams of portable electronic devices respectively according to two embodiments of this disclosure. In the embodiments as shown in FIG. 4A and FIG. 4B, the antenna 1' comprises a first metal layer 11a, a second metal layer 11b, a balun transformer 13 and a regulation circuit 15, wherein the detailed structures thereof and connections therebetween are similar to those in the aforementioned embodiment of FIG. 1B, so they are not repeated herein. In the embodiment as shown in FIG. 4A, the balun transformer 13 and the regulation circuit 15 of the antenna 1' are disposed in the hinge 23 of the portable electronic device; in the embodiment as shown in FIG. 4B, the balun transformer 13 and the regulation circuit 15 are disposed in the first casing 21a or the second casing 21b. In practice, the balun transformer 13 and the regulation circuit 15 can be simultaneously disposed in the first casing 21a, the second casing 21b or the hinge 23, or be respectively disposed in two of the first casing 21a, the second casing 21b and the hinge 23. In the embodiments as shown in FIG. 4A and FIG. 4B, the first metal layer 11a is formed in the corner region of the first casing 21a near the hinge 23, and the second metal layer 11b is formed in the corner region of the second casing 21b near the hinge 23. All of the shapes, dispositions and corresponding functions of the first bending side edge 111a of the first metal layer 11a and the second bending side edge 111b of the second metal layer 11b are similar to those describe in the aforementioned embodiment of FIG., so they are not repeated. Moreover, the first metal layer 11a and the second metal layer 11b of the antenna 1' can also be implemented in the shapes and the dispositions as shown in FIG. 3B or FIG. 3C, and the related details are not repeated.

In view of the above description, in the portable electronic device and the antenna thereof provided in this disclosure, the metal layers of the antenna are respectively disposed in the corner regions of the two casings near the hinge of the portable electronic device, and the gap among the corner regions of the two casings and the hinge is used to be the slot for outputting an electromagnetic wave. In the fabrication process of the antenna of the portable electronic device, there is possibly no need to perform etching process of a slot on the metal layer, and also possibly no need to design an antenna pattern with a slot and to perform printing process. Therefore, the fabrication process of the slot may be removed, and the entire fabrication process may be simplified. Moreover, because there is possibly no need to dispose a slot on the casing, the portable electronic device may be designed to have all-metal casing and its external appearance may be improved.

What is claimed is:

1. A portable electronic device, comprising:
  a main body comprising a first casing, a second casing and a hinge, with the hinge connecting the first casing and the second casing so as to allow the first casing to be flipped relatively to the second casing; and
  an antenna configured to output an electromagnetic wave and comprising:
    a first metal layer having a first bending side edge and a first feed position;
    a second metal layer having a second bending side edge and a second feed position, wherein a tapered slot is formed between the second bending side edge and the first bending side edge and comprises a necking end and a flaring end; and
    a balun transformer disposed in the first casing, the second casing or the hinge, and having one signal input terminal and two signal output terminals, with the two signal output terminal respectively connected with the first feed position and the second feed position, and the balun transformer receiving a feed signal and a ground signal via the signal input terminal, generating two balanced signals based on the feed signal and the ground signal, and respectively outputting the two balanced signals via the two signal output terminals;
  wherein the first metal layer is formed at the first casing, and the second metal layer is formed at the second casing.

2. The portable electronic device according to claim 1, wherein the first bending side edge is aligned with a corner of the first casing, and the second bending side edge is aligned with a corner of the second casing.

3. The portable electronic device according to claim 1, wherein the first bending side edge and the second bending side edge respectively have two convex arcs, and the two convex arcs are oppositely disposed to form the tapered slot.

4. The portable electronic device according to claim 1, further comprising a regulation circuit having a first side and a second side, with the first side of the regulation circuit connected with the two signal output terminals, and the second side connected with the first feed position and the second feed position.

5. The portable electronic device according to claim 4, wherein the regulation circuit is disposed in the first casing, the second casing or the hinge.

6. The portable electronic device according to claim 4, wherein the regulation circuit comprises two impedance matching circuits configured to perform impedance matching of the antenna.

* * * * *